No. 740,489. PATENTED OCT. 6, 1903.
J. G. THRASHER.
LAWN SHEARS.
APPLICATION FILED JAN. 14, 1902.
NO MODEL. 2 SHEETS—SHEET 1.
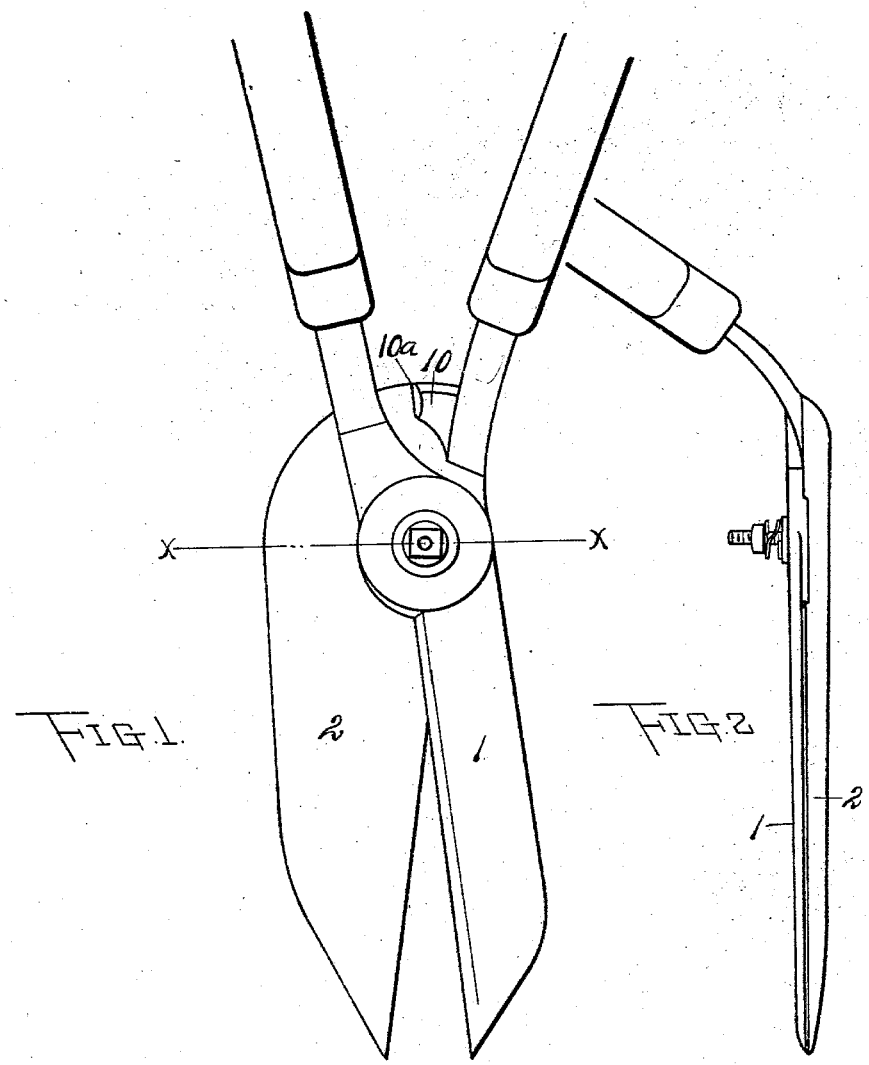

No. 740,489. PATENTED OCT. 6, 1903.
J. G. THRASHER.
LAWN SHEARS.
APPLICATION FILED JAN. 14, 1902.
NO MODEL. 2 SHEETS—SHEET 2.
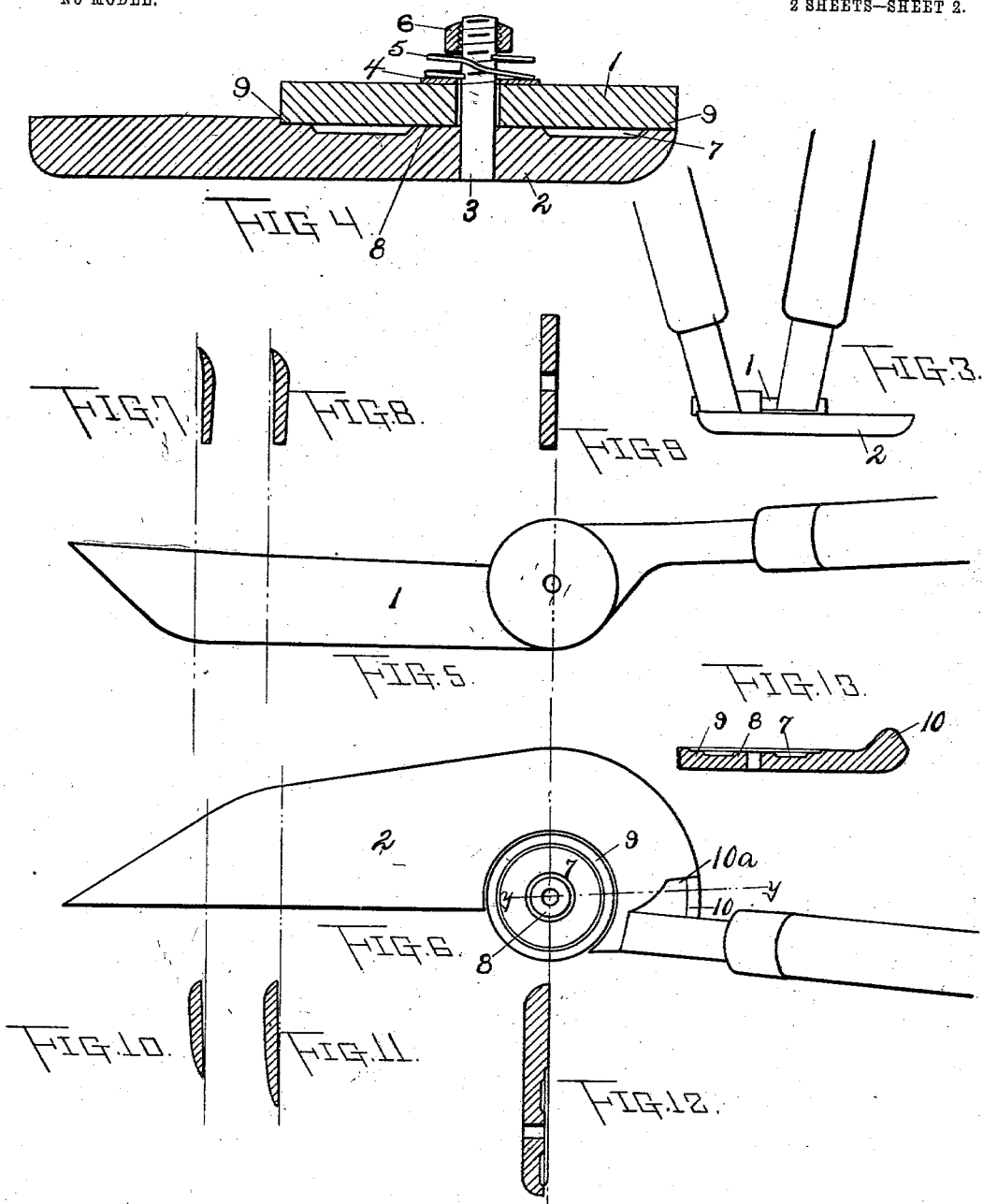
WITNESSES: John G. Thrasher INVENTOR
BY
Geo. B. Willcox ATTORNEY No. 740,489. Patented October 6, 1903.

UNITED STATES PATENT OFFICE.

JOHN G. THRASHER, OF BAY CITY, MICHIGAN, ASSIGNOR OF ONE-HALF TO FRANK A. WRIGHT, OF TRENTON, MICHIGAN.

LAWN-SHEARS.

SPECIFICATION forming part of Letters Patent No. 740,489, dated October 6, 1903.

Application filed January 14, 1902. Serial No. 89,776. (No model.)

*To all whom it may concern:*

Be it known that I, JOHN G. THRASHER, a citizen of the United States, residing at Bay City, in the county of Bay and State of Michigan, have invented certain new and useful Improvements in Lawn-Shears; and I do hereby declare the following to be a full, clear, and exact description of the invention, such as will enable others skilled in the art to which it appertains to make and use the same.

This invention relates to lawn-shears.

The object of my invention is to produce a pair of lawn-shears that is simple in construction, inexpensive to manufacture, and provided with a lower blade having extended area for bearing upon the lawn, the two blades being connected by a joint of such construction that the blades will be retained in proper alinement when subjected to wear and rough usage.

A further object is to provide a joint whereby the blades will be flexibly pressed together to keep them always at the same tension.

My invention is illustrated in the accompanying drawings, in which—

Figure 1 is a top perspective view of the blades. Fig. 2 is a side view. Fig. 3 is a rear view. Fig. 4 is an enlarged section taken on the line x x of Fig. 1. Fig. 5 is a plan view of the upper blade. Fig. 6 is a plan view of the lower blade. Figs. 7 and 8 are transverse sections through the upper blade. Fig. 9 is a transverse section through the pivotal bearing of the upper blade. Figs. 10 and 11 are transverse sections through the lower blade, and Fig. 12 is a section of the lower blade through its pivotal bearing. Fig. 13 is a section on the line y y of Fig. 6.

As is clearly shown in the drawings, the shears consist in an upper blade 1 and a lower blade 2, pivoted together. The lower face of the upper blade 1 is slightly warped, as shown in Figs. 7 and 8, the amount of warp or twist increasing from the pivot toward the point of the blade. The upper face of the lower blade is correspondingly twisted, as shown in Figs. 10 and 11, the effect being to give close contact to the cutting edges and clearance between the blades back of the cutting edges, so that the shears cut easier. In order to provide ample bearing-surface at the joint and to prevent looseness of the joint due to a twisting action of the handles, I make the pivotal joint as shown in Figs. 4 and 13, where 3 is a pivot or pin rigidly secured to the lower blade by being cast in or fixed in place by other suitable means. Upon this pivot the upper blade 1 is revolubly mounted. A washer 4 is put on the pivot 3 next the upper blade, and a spring-washer 5 is then put on and held in place by a nut 6, screwed upon the threaded upper end of the pivot 3. By means of the nut 6 and the spring-washer 5 the upper blade 1 can be pressed down upon the lower blade with any desired amount of force and is yieldingly held in place even after the bearing between the two blades becomes worn. As above noted, increased bearing area between the upper and lower blades is secured, and wearing due to the twisting movement of the handles is avoided and efficient lubrication is also secured by constructing the joint as shown in Figs. 4, 13, 5, and 6. In the lower blade around the pivot is formed an annular cavity 7. Inside this cavity is a hub 8, the upper surface of which is finished to form a bearing for the upper blade. A similar bearing-surface 9 is provided around the outside of the annular cavity 7. Powdered graphite or any other suitable lubricant is placed in the cavity 7, and by the action of the shears when in use small quantities are distributed over the bearing-surfaces 8 and 9, thereby efficiently lubricating the shears and greatly increasing their ease of operation.

In order to prevent the handles of the shears from coming too close together and also to prevent the upper blade from traveling too far over the lower blade, I provide at the rear of the lower blade a stop 10, which is preferably cast integral with the blade 2. The heel of the blade 1 strikes the face of this stop, and its movement is thereby arrested. As the blades wear and are resharpened their cutting edges recede, and it is then necessary to permit the handles to come closer together in order to give the same amount of overtravel. This is easily accomplished by filing away the face $10^a$ of the stop 10. The lower blade 2 is of much greater width than the upper blade 1 and is much heavier. The object of increasing the width of the lower blade is to provide underneath the cutting edge a large amount of bearing-surface, by which the weight of the tool is supported on the lawn when the shears are in use. Another advantage of this increased area at the rear of the blade 2 is that it permits the handles to be tipped back without lifting the weight of the tool from the ground, thereby rocking the shears back and raising the points of the blades.

By making the lower blade heavy, as indicated in Figs. 4 and 12, a twofold object is accomplished. First, the lower blade being approximately equal in thickness to the height at which the grass is to be cut, it can be pushed over the lawn after the manner of a lawn-mower and will always cut the grass at an even height; secondly, the weight of the enlarged lower blade 2 adds stability to the tool. The lower blade 2 is moved along the lawn and acts as a guide in cutting; but the upper blade 1, which is much lighter, and therefore more easily manipulated, is manipulated with a transverse shearing motion as the shears advance. By this arrangement while one hand is guiding the lower blade and pushing it forward the other hand is operating the lighter blade to do the cutting.

By the means above described I have produced a pair of lawn-shears having only two moving parts of simple construction and capable of being manufactured at a minimum cost.

What I claim as my invention, and desire to secure by Letters Patent, is—

A pair of lawn-shears comprising a pivoted vibrating upper blade; a non-vibrating lower blade of increased area of its lower surface, forming a broad support for the shears; a rearward extension of large area and formed integral with said blade, located back of its pivotal point and forming means whereby the blades may be tilted clear of the ground without lifting the tool; said blades having straight cutting edges and having their adjacent faces warped away from each other, the amount of warp increasing from the pivot to the points of the blades, the lower blade being formed with a stop at the rear thereof, substantially in line with the pivot, substantially as described.

In testimony whereof I affix my signature in presence of two witnesses.

JOHN G. THRASHER.

Witnesses:
GEO. B. WILLCOX,
I. GOULD.